United States Patent [19]

Ahmed

[11] Patent Number: 5,863,979
[45] Date of Patent: Jan. 26, 1999

[54] PAPER MAKING METHOD EMPLOYING NOVEL BEATER BAG WITH WATER DISPERSABLE HOT MELT SEALED CLOSURE

[75] Inventor: Sharf U. Ahmed, Woodbury, Minn.

[73] Assignee: H. B. Fuller Licensing and Finance, Inc., St. Paul, Minn.

[21] Appl. No.: 728,961

[22] Filed: Oct. 11, 1996

Related U.S. Application Data

[60] Continuation-in-part of Ser. No. 482,442, Jun. 7, 1995, abandoned, which is a division of Ser. No. 142,668, Oct. 26, 1993, abandoned.

[51] Int. Cl.$^6$ .................................................. C08G 69/26

[52] U.S. Cl. .................... 524/538; 524/227; 524/229; 524/230; 524/318; 524/487; 528/335; 528/338; 528/339; 528/340

[58] Field of Search .................................. 524/538, 279, 524/227, 230, 318, 487; 528/335, 338, 339, 340

[56] References Cited

PUBLICATIONS

"Glass Transition in Nylons", by Gerald A. Gordon, *Journal of Polymer Science: Part A–2*, vol. 9, 1971, pp. 1693–1702.

"Some Observations on Transitions in Aliphatic Polyamides", by M.G. Norholt, B.J. Tabor and J.J. van Aartsen, *Progress in Colloid & Polymer Science*, vol. 57, 1975, pp. 225–235.

*Primary Examiner*—Nathan M. Nutter
*Attorney, Agent, or Firm*—Vidas, Arrett & Steinkraus, P.A.

[57] ABSTRACT

A method of making paper in which dry chemical additives are incorporated into the pulp mixture by addition of an entire bag containing the additive directly to the mixture, the improvement being that the bag is sealed with an adhesive closure, the adhesive being a hot melt consisting essentially of a water dispersable polyamide prepared from a diacid component comprising in major portion an aliphatic diacid of 6 or fewer carbon atoms and a diamine component consisting of one or more compounds of the formula:

$$H_2N-C_yH_{2y}-(OC_2H_4)_x-O-C_yH_{2y}-NH_2$$

where y is 2 or 3 and x is 1–50 and a wax. Such bags will not leak in shipping and handling, and yet can be added directly to paper batches at ambient temperature in the manner of the unsealable bags employed in the prior art.

9 Claims, 1 Drawing Sheet

PAPER MAKING METHOD EMPLOYING NOVEL BEATER BAG WITH WATER DISPERSABLE HOT MELT SEALED CLOSURE

CROSS-REFERENCE TO RELATED APPLICATION

The application is a Continuation-in-part of application Ser. No. 08/482,442, filed Jun. 7, 1995, and now abandoned the disclosure of which are herein incorporated by reference, which application is a Divisional of Ser. No. 08/142,668, filed Oct. 26, 1993, and now abandoned.

BACKGROUND OF THE INVENTION

In U.S. Pat. No. 3,882,090 there is disclosed hot melt seizing and adhesive compounds which employ water soluble polyamides made from one or more of the diacids selected from the group consisting of adipic, pimelitic and suberic acids and an aliphatic diamine having the formula:

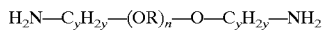

$H_2N-C_yH_{2y}-(OR)_n-O-C_yH_{2y}-NH_2$ where R is ethylene, 1,2-propylene or 1,3-propylene and n is an integer of 1 to about 13. The hot melt adhesives are said to be useful in making paper bags or book binding as the water solubility of the hot melt provides a method by which scrap paper can be recovered by repulping and adding the pulp back in the paper-making process. Such repulping operations utilize shredded scrap, elevated temperatures, typically 90°–110° F., and result in a separately generated batch of regenerated fiber.

In the paper manufacturing industry it is well known to use dry additives, such as the whitening agent titanium dioxide, which are shipped in large paper bags which must be individually opened and dumped into the pulp mixture. Typically such additives are added to an ambient temperature mixture, i.e. 60°–80° F. Recently, some such dry additives have been packaged in "beater bags" which are substantially closed across the top, using conventional water soluble bag manufacturing adhesives, except for a fold-in spout through which the bag is filled. The entire bag is then thrown into the pulp mixture for a batch of paper. The bag disintegrates, becoming incorporated into the pulp mixture along with its contents. Such beater bags have the disadvantage, however that filling through the spout is difficult and that after filling and folding in of the spout, the bag remains unsealed and therefore allows for leakage of the contents during shipping and handling.

It is known to utilize hot melt adhesives to seal bags of dry bulk chemicals but the adhesives previously used for this purpose have been incompatible with the pulp mixture and will cause discoloration or spotting of the manufactured paper.

There therefore exists a need for an improved beater bag which can be employed in paper making operations which can be sealed after filling and which and will cause discoloration or spotting of the manufactured paper.

SUMMARY OF THE INVENTION

Applicants have discovered that polyamides made from a polyethylene glycol diamine, or a bis-propylamine terminated polyethylene glycol, can be successfully employed as hot melt sealing adhesives for beater bags which will not leak in shipping and handling, which can be added directly to paper batches at ambient temperature without prior repulping and which will not cause discoloration or spotting of the paper produced from the batch.

The invention is in one aspect an improved method of making paper in which dry chemical additives are incorporated into the pulp mixture by addition of an entire bag containing the additive directly to the mixture, the improvement being that the bag is sealed with an adhesive closure, the adhesive being a hot melt consisting essentially of a water dispersable polyamide prepared from a diacid component comprising in major portion an aliphatic diacid of 6 or fewer carbon atoms and a diamine component consisting of one or more compounds of the formula:

$H_2N-C_yH_{2y}-(OC_2H_4)_x-O-C_yH_{2y}-NH_2$ where y is 2 or 3 and x is 1–50.

Bags containing dry chemicals sealed with a hot melt adhesive strip as described comprise further aspects of the invention method.

DETAILED DESCRIPTION OF THE PREFERRED EMBODIMENTS

As used herein, the term water-dispersable is used to refer to adhesives which, in layers of conventional adhesive thickness, readily dissolve or disperse in ambient temperature water without treatment other than simple agitation.

Figure 1:
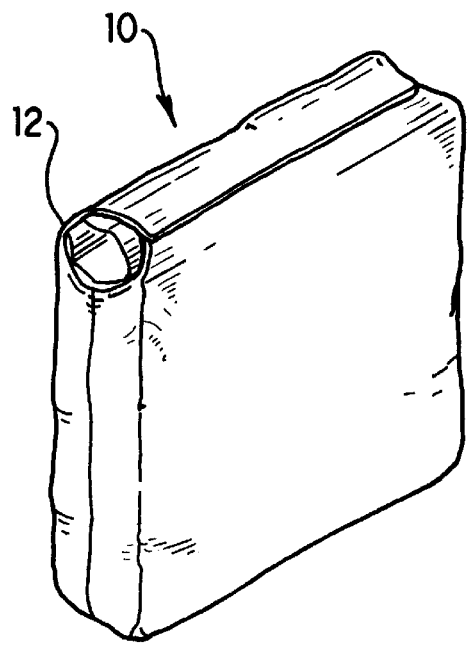
FIG. 1 is a perspective view of a beater bag of the prior art.

Referring first to FIG. 1, there is shown a beater bag 10 of the prior art. Bag 10 is assembled with a water based adhesive such as a starch based adhesive. However, such adhesives are not suitable for gluing filled bags. Consequently, the prior art bag 10 is provided with a glued spout 12 through which the bag is filled. The spout is then folded in so as to close, but not seal, bag 10. Filling bag 10 through the spout 12 is relatively difficult, and during shipping and handling it can, and often does, leak. Leakage creates extra work in cleanup and, depending upon contents, can be hazardous to workers handling such spout bags.

Figure 2:
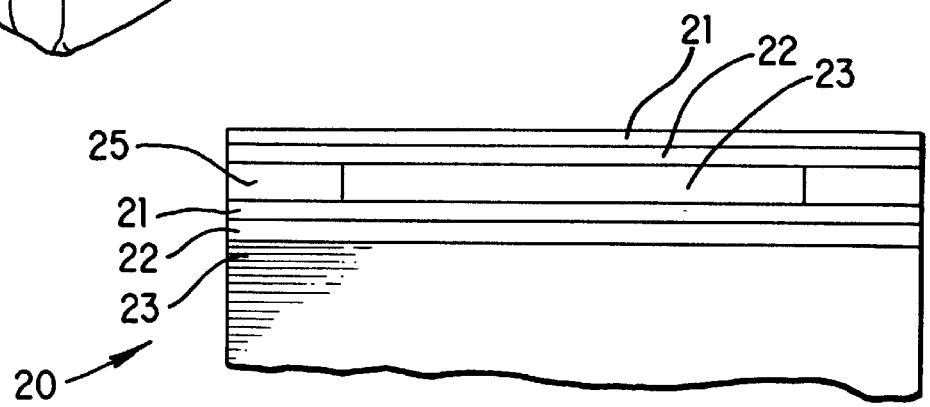
FIG. 2 is a fragmentary view of an unfilled hot melt sealable beater bag in accordance with the invention.
Figure 3:
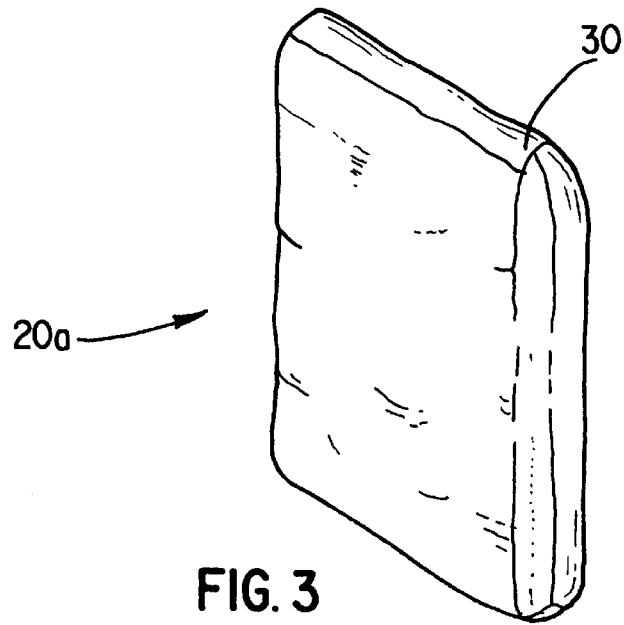
FIG. 3 is a perspective view of a filled and sealed beater bag in accordance with the invention.

A pinch bag 20, 20a of the invention is shown in FIGS. 2–3. A pinch bottom bag with an open end is assembled within a water-dispersable instant adhesive, for instance, a starch-based adhesive as in bag 10 or a hot melt adhesive as described hereinafter. Bag 20 is suitably a multi-ply bag with the ends 21, 22, 23 of each ply staggered as shown in FIG. 2. A layer of water-dispersable hot melt 25 is applied to the open end of bag 20 over the staggered ply ends. The open bag is easily filled, without requiring special handling to fit the spout 12 of the prior art bag onto a special filling apparatus.

The bag 20 of the invention may be closed after filling by use of conventional apparatus for closing and sealing bags containing hot melt closure strips to produce a filled closed bag 20a. An example of such an apparatus is the PCB-5600 pinch bag closer sold by Fishbein Company, Minneapolis Minn.

Filled, closed bag 20a, as shown in FIG. 3 has a fully sealed closure 30. Unlike other hot melt closed bags, however, the use of the water-dispersable hot melt adhesive allows the bag to be used as a beater bag in the known paper-making process for which the prior art bag 10 was designed. Because the hot melt is applied to each ply, the closure is very strong and will not leak, even when subjected to very rough handling. Thus, the use of a pinch bag closed with a water-dispersable hot melt adhesive comprises a significant advance in the art.

The preferred hot melts utilized in the invention are additionally able to withstand normal packaging and handling stresses even when the contents are at temperatures substantially above ambient temperature. In particular, titanium dioxide powders are commonly bagged as they are produced, or after only short times thereafter. It is typical that the powders will still be warm on filling. Pallets of the filled bags will retain heat for considerable time. The hot melt adhesives used in the invention are able to maintain adequate bond strength on such warm pallets so that the seal 30 is not jeopardized. This warm strength is a property previously unreported for the water dispersable hot melt adhesives employed in the invention.

While the use of polyamides of U.S. Pat. No. 3,882,090, based on one or more of the diacids selected from the group consisting of adipic, pimelitic and suberic acids and an aliphatic diamine having the formula:

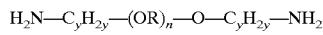

where R is ethylene, 1,2-propylene or 1,3-propylene and n is an integer of 1 to about 13 is contemplated, the applicants have discovered further water dispersable polyamides which can be employed as hot melt adhesives.

The polyamides may be used alone or in combination with minor amounts of conventional hot melt additives, such as antioxidants, melt viscosity modifiers, waxes, and the like, provided that the additives do not themselves adversely affect the water dispersability of the adhesive formulation. Water-dispersable polyamides can be prepared by reacting adipic acid with polyethylene glycol diamines, like triethylene glycol diamine (Jeffamine® EDR-148) or tetraethylene glycol diamine (Jeffamineg® ER-192) or a combination of the two diamines. Use of lower carbon diacids with the two diamines also provide water-dispersable polyamides. Polyamides from diacids with higher carbon numbers ($C_7$ or greater) are insoluble in water, but a combination of these higher diacids with adipic acid can produce water-soluble or waterdispersable polyamides. Increasing the amount of higher carbon diacids in conjunction with adipic acid results in polyamides with decrease in solubility. However, this can be compensated by increasing the EO (ethylene oxide) content of a portion of the polyethylene glycol diamine component. Jeffamine® ED 600, ED 900, ED 2000, D-230, D-400 and D-2000 are examples of higher EO content polyoxyalkylene diamines which may be employed. Thus, in particular, Dimer Acid can be used in combination with adipic acid when triethylene glycol diamine or tetraethylene glycol diamine are employed in combination with the polyoxyalkylene diamines Jeffamine® ED 600 or D 400.

The polyamides employed in the invention may be prepared as described in Example 1 of U.S. Pat. No. 3,882,090. Modifications of the recipe given in that example may be made as described above. Typical recipes are given below for illustrative purposes only, it being understood that those skilled in the art can readily modify the recipes without departing from the invention hereof:

|  | Parts By Weight |
|---|---|
| 1) Adipic Acid | 146.14 |
| Triethylene Glycol Diamine | 148.0 |
| 2) Adipic Acid | 146.14 |
| Tetraethylene Glycol Diamine | 192.0 |
| 3) Adipic Acid | 146.14 |
| TTD[1] Diamine | 220.3 |

[1] 4,7,10-trioxatridecane-1,13-diamine

Polyamide melt viscosity can be controlled by adding small amounts, typically less than 5%, preferably 0.5–2.5% based on total acid weight of monoacids such as stearic or benzoic acid. An example recipe is given below:

| 4) Adipic Acid | 145.4 |
|---|---|
| Stearic Acid | 2.7 |
| TTD Diamine | 220.3 |

Recipes 5 and 6 below illustrate the use of acids of $C_7$ or higher carbon content.

| 5) Adipic Acid | 164.4 |
|---|---|
| Triethylene Glycol Diamine | 205.8 |
| Azelaic Acid | 71.3 |
| Jeffamine ® D-400 | 61.8 |
| 6) Adipic Acid | 146.1 |
| Diner Acid | 57.8 |
| Jeffamine ® ED-600 | 60.0 |
| Tetraethylene Glycol Diamine | 198.4 |

Similar results are also obtained when an equivalent amount of tetraethylene glycol diamine or TTD Diamine is employed in place of the triethylene glycol diamine of recipe 5 and when an equivalent amount is employed in place of the tetraethylene glycol diamine of recipe 6.

The water dispersable hot melts of the invention further preferably contain water insoluble waxes such as fatty amide waxes, fatty acid waxes, oxidized polyethylene waxes and oxidized Fischer-Tropsch waxes. The invention further contemplates the addition of other functionalized waxes which would be compatible in the adhesives of the invention. Compatibility refers to a smooth and substantially homogeneous mixture which does not phase separate even though the waxes may be considered "water insoluble", surprisingly they do not prevent the adhesives of the invention from being repulpable and soluble in water. In order to effectively utilize the polyamides in the above mentioned beater bag application, such waxes are desired.

The preferable range for non-reactive waxes is approximately 1–15% by weight. Most preferably the range is 3–10%. The preferable range for reactive waxes is approximately 1–10% by weight. Most preferably the range is 2–6%. Higher percentages of the wax as a reactive component can lead to side reactions, change in viscosities and/or phase separation, leading to poor machinability. Reactive waxes are preferable because their incorporation results in a single component product.

The following examples are water soluble polyamides which also contain a water insoluble wax. These examples have been determined to be better performing adhesives in the beater bag application than comparable water soluble polyamides that do not contain a wax. A wax will lower the viscosity of the adhesive increasing penetration of the adhesive into the substrates on which a bond is desired therefore creating a stronger bond with more fiber tear. The resultant adhesives also set faster which is an important attribute for running on plant equipment. A need for increased efficiency in manufacturing facilities results in ever increasing line speeds and therefore a need for faster setting adhesives.

Example Formulations Using Wax

| FORMULATION #1 | Parts by Weight |
| --- | --- |
| Adipic Acid | 164.4 |
| Azelaic Acid | 71.3 |
| Jeffamine ® EDR-148 | 205.8 |
| Jeffamine ® D-400 | 61.8 |
| Irganox 1098 | 8.5 |
| Kenamide W 40 Wax | 36.0 |

The Kenamide W 40 in the table above is a water insoluble wax and chemically is a bis-stearamide of ethylene diamine or N,N-ethylene bis-stearamide. It is available from Witco Chemical Corp. located in Memphis, Tenn. The remaining ingredients are reacted prior to the addition of the wax. The Kenamide W 40 Wax is then mixed into the reactive hot melt as an inert ingredient.

| FORMULATION #2 | Parts by Weight |
| --- | --- |
| Adipic Acid | 164.4 |
| Azelaic Acid | 71.3 |
| Jeffamine ® EDR-148 | 205.8 |
| Jeffamine ® D-400 | 61.8 |
| Irganox 1098 | 7.5 |
| Wax S | 20.4 |

The Wax S in Formulation #2 is a water insoluble wax known as a technical montanic acid wax or a montanic fatty acid wax. Wax S is available from Hoechst Celanese located in Charlotte, NC. In the above Formulation #2, the remaining ingredients of the polyamide were first combined and were heated at 240°–250° C. for 2 hours. Substantially all of the water was then removed. The Wax S was then incorporated by adding it to the resultant polyamide at a temperature of between 240°–250° F. and allowed to react for 1½–2 hours. In this example, the wax is a reactive component of the adhesive, and provides the adhesive with a fast rate of set. This adhesive is therefore a single component product and not a blend.

The following tests were conducted on the resulting formulations to measure effectiveness.

TEST METHODS
1. REPULPABILITY

A. TAPPI Useful Method 666 or UM666—Adhesive samples are agitated at high speeds in a Waring blender for 15 seconds using water at the desired temperature. The resulting mixture is filtered through a 60-mesh screen. If nothing is retained on the screen, the adhesive is completely repulpable.

B. Stone Container Pulping Method #2—Adhesive coated kraft paper is pulped to form handsheets. Using this method, 40.0 g of adhesive coated paper is cut into 1 in.×1 in. squares. The squares are then added to a Noram CA 371 model disintegrator containing 1600 ml of water. The water may be at room temperature or at elevated temperatures. The mixture is agitated for 25 minutes to form the pulp. Handsheets are then made by collecting either 100 ml or 200 ml of the pulp. The absence of any spotting on the resultant dried handsheet indicates that the adhesive was completely repulped.

2. MELT VISCOSITIES

The melt viscosities of the hot melt adhesives were determined on a Brookfield Thermosel Viscometer Model DV I using a number 27 spindle.

3. BONDING TESTS

Between 1 and 2 mls of adhesive were coated on the beater bags. The bags were then heat sealed using a Fishbein Model # PBC 5600 Pinch Bag Closer. The platen air temperature was set at about 530° C. (about 980° F.) while the actual temperature was about 450° C. (about 850° F.); line speed was 38.5 feet per minute; seal pressure was 15 psi; and air flow was 8.0 cubic feet per minute. Once the bags have been sealed using this method, then the amount of fiber tear from the bags is observed. Adhesives are rated using a comparative method. The more fiber tear, the better the adhesive, with 100% fiber tear being the best.

RESULTS
1. FORMULATION #1

Repulpability was tested using the TAPPI Useful Method 666 and the Stone Container Method #2. The resulting adhesive was found to be completely repulpable in both tests.

The resulting viscosity for this product was 5000 cPs to 6000 cPs. The acceptable viscosity range for the beater bag application is less than about 15,000 cPs.

Good to excellent fiber tear was observed.

2. FORMULATION #2

Repulpability was tested using the Stone Container Method #2. No spotting was observed with this product. The handsheets were made using both 200 ml and 100 ml of pulp. No heat was used. This indicates that the product was 100% repulped.

The resulting viscosity for this product was 8000 cPs to 12,000 cPs. The acceptable viscosity range for the beater bag application is less than about 15,000 cPs.

Good to excellent fiber tear was observed.

The use of the above mentioned waxes improve the adhesive nature of the polyamide dispersion without appreciably affecting the repulpability and solubility of the formulation. The surprising dispersability of the adhesive with the incorporation of the waxes also illustrated in the repulpability test by the fact that no wax is found in final repulped mixtures or handsheets.

The polyamide formulation of the present invention also displays surprising humidity resistance, which is increased with the incorporation of the waxes. Examples of such resistance in analogous polyamide adhesives may be found in the U.S. patent application, Ser. No. 08/634,281, which is incorporated herein by reference.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A hot melt adhesive consisting essentially of a water dispersable polyamide prepared from an acid component comprising in major portion an aliphatic diacid of 6 or fewer carbon atoms and a diamine component consisting of one or more diamine compounds of the formula:

$$H_2N-C_2H_4-(OC_2H_4)_x-O-C_2H_4-NH_2$$

where x is 1–50 and a water insoluble wax, the adhesive being repulpable and dispersible when incorporated into a pulp mixture of a paper making procedure.

2. The adhesive as in claim 1, wherein the wax is chosen from the group consisting of fatty amide waxes, fatty acid waxes, oxidized polyethylene waxes and oxidized Fischer-Tropsch waxes.

3. The adhesive as in claim 2, the wax being a non-reactive wax and being in the amount of 1–15% by weight.

4. The adhesive as in claim 2, the wax being a reactive wax and being in the amount of 1–10% by weight.

5. The adhesive as in claim 3, the wax being a bis-stearamide of ethylene diamine.

6. The adhesive as in claim 4, the wax being a montanic fatty acid wax.

7. The adhesive as in claim 1 wherein the major part of said diamine component is a diamine compound in which x is 1–4.

8. The adhesive as in claim 1 wherein the acid component comprises, in minor part, a $C_7$ or higher diacid compound.

9. The adhesive as in claim 1 wherein the polyamide acid component further comprises 0.5–5% based on total acid component weight of a monoacid.

* * * * *